United States Patent [19]
Nishimura et al.

[11] Patent Number: 5,675,467
[45] Date of Patent: Oct. 7, 1997

[54] CIRCUIT MOUNTING UNIT

[75] Inventors: Hisayuki Nishimura; Shigeru Honda; Naohiro Shibata, all of Kawasaki, Japan

[73] Assignee: Fujitsu Limited, Kawasaki, Japan

[21] Appl. No.: 496,112

[22] Filed: Jun. 28, 1995

[30] Foreign Application Priority Data

Nov. 30, 1994 [JP] Japan .................... 6-296468

[51] Int. Cl.⁶ .................................. H02H 7/20
[52] U.S. Cl. ........................... 361/58; 307/147
[58] Field of Search ................. 361/58, 110, 118, 361/62; 439/377; 307/147; 395/325, 750, 800, 500; 323/908

[56] References Cited

U.S. PATENT DOCUMENTS

| | | | |
|---|---|---|---|
| 4,245,270 | 1/1981 | Busby | 361/58 |
| 5,077,675 | 12/1991 | Tam | 361/58 |
| 5,268,592 | 12/1993 | Bellamy et al. | 361/58 |
| 5,272,584 | 12/1993 | Austruy et al. | 361/58 |
| 5,317,697 | 5/1994 | Husak et al. | 395/325 |
| 5,369,593 | 11/1994 | Papamarcos et al. | 364/488 |
| 5,530,302 | 6/1996 | Hamre et al. | 307/147 |

*Primary Examiner*—Fritz Fleming
*Attorney, Agent, or Firm*—Armstrong, Westerman, Hattori, McLeland, & Naughton

[57] ABSTRACT

The present invention relates to a circuit mounting unit that can prevent a voltage drop and noise occurrence due to current inflow at the time of a hot insertion or withdrawal operation without mounting a capacitor with large capacitance on the side of a main unit. The circuit mounting unit includes a first voltage control unit that controls to increase gradually a voltage supplied to a load voltage converter from the main unit side to a predetermined voltage when the circuit mounting unit is exchangeably inserted into or pulled out of the main unit without halting electric power supplied from the main unit. The circuit mounting unit is mounted onto a printed wiring board on which various elements such as ICs and LSIs are previously mounted to form a predetermined circuit.

26 Claims, 13 Drawing Sheets

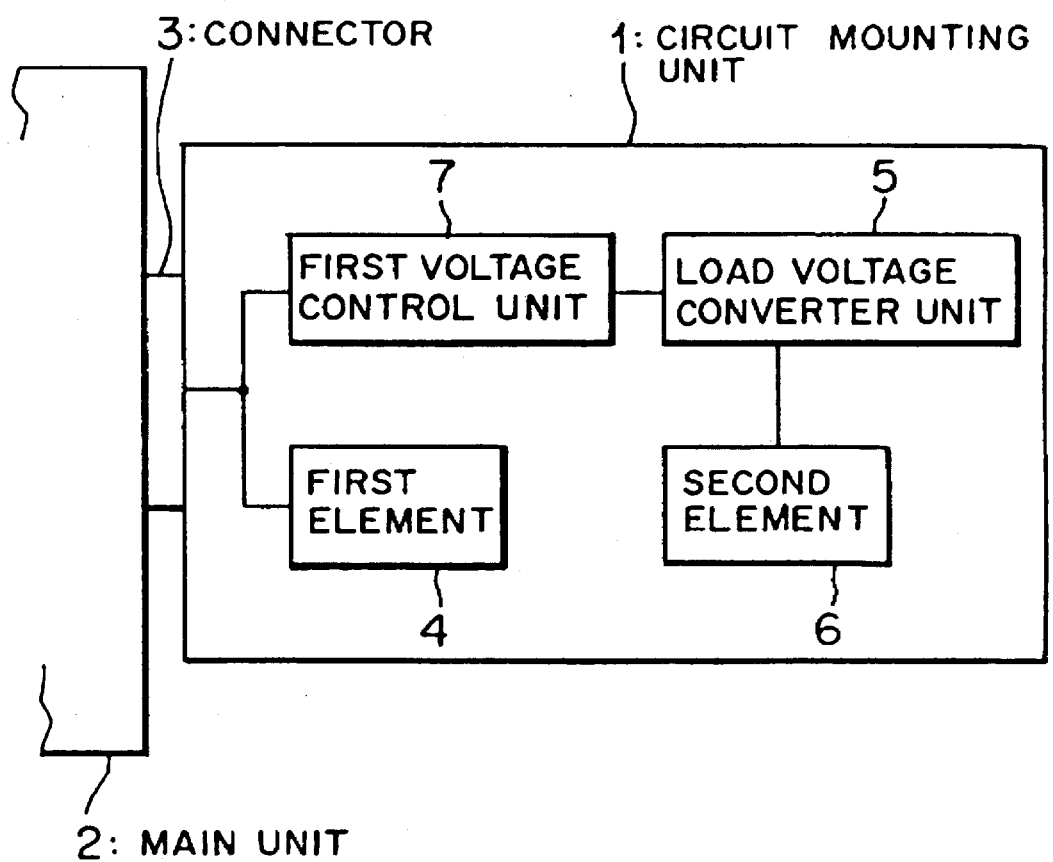

FIG. IC
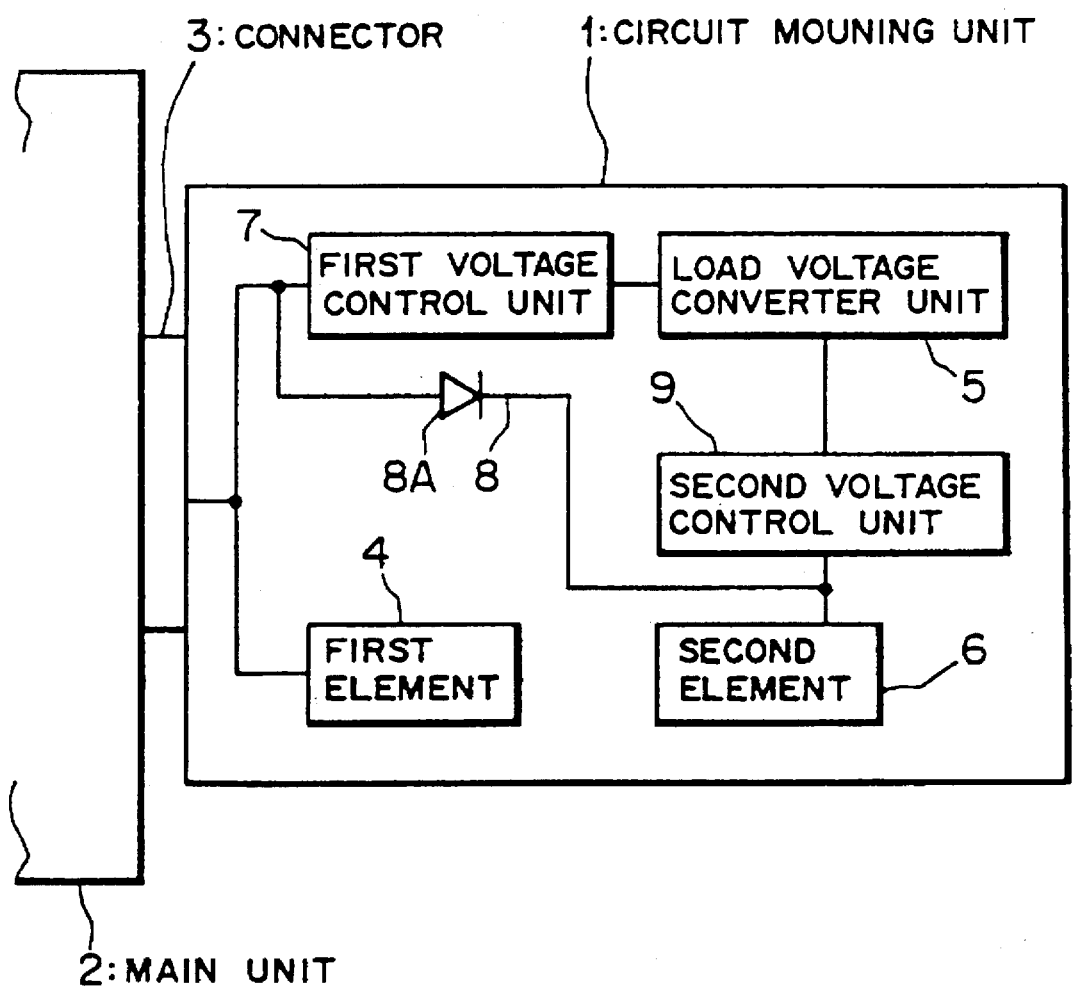

CIRCUIT MOUNTING UNIT

BACKGROUND OF THE INVENTION

1) Field of the Invention

The present invention relates to a circuit mounting unit such as a printed wiring board on which various elements such as ICs and LSIs are mounted to perform previously a predetermined circuit. More particularly, the present invention relates to a circuit mounting unit which can be replaced in a hot (or live) state on the back panel of a main unit such as a computer system.

Recently, since the computer systems with high reliability are required, it has been desired to include a mechanism that can be replaced and repaired without stopping its system operation at a failure occurrence.

2) Description of the Related Art

Generally, in computer systems, various printed wiring boards (circuit mounting units) are mounted on the back panel via connectors. In the case of abnormal occurrence, an abnormal printed wiring board is pulled off out of the back panel, and then a normal printed wiring board with the same function is inserted into the back panel to repair the system.

Various elements such as ICs and LSIs are mounted on a printed wiring board to form previously a predetermined circuit. Each printed wiring board performs a predetermined function. Such a printed wiring board is mounted on the back panel to receive electric power and various signals from the device body via the connector. Thus with the printed wiring board mounted on the back panel, electric power and various signals are supplied from the main unit via a connector. The elements operate on electric power supplied to process various signals. Then the processed results are fed back to the main unit.

Most of various elements mounted on the same printed wiring board are usually operated on the voltage supplied from the back panel (main unit) without any change. However, some kinds of elements mounted are driven on a voltage different from that supplied from the back panel. The consumption current of elements driven on a different voltage is considerably smaller than that of the entire system.

Hence arranging a different voltage source on the side of the main unit leads to an increase of the manufacturing cost. In this case, a voltage converter is generally mounted that converts an electric power from the main unit into a suitable voltage for elements (loads) driven on a different voltage on the printed wiring board.

For example, FIG. 14 illustrates ICs 51 and 52 each of which is driven on the voltage supplied from the back panel 60, and an IC 53 which is driven on a voltage different from that supplied from the back panel side 60 on the printed wiring board 50. In this case, a DC-DC converter 54 acting as a load voltage converter that converts an electric power from the back panel 60 into a suitable voltage is mounted as the front stage of the IC 53. The IC 53 is driven on a voltage converted with the DC-DC converter 54.

In the case where plural elements is driven on a voltage different from that supplied from the back panel 60 are mounted, the DC-DC converter may be prepared for each of the elements. However, a single DC-DC converter can convert voltages for plural elements in the range of its current capability.

A bypass capacitor 55 with large capacitance is mounted to the DC-DC converter 54 to suppress a variation in load to the IC 53 and to remove noises produced between the input power source and the ground. A current smoothing capacitor 57 is mounted to the voltage control unit 56 in the DC-DC converter 54.

Referring to FIG. 14, numeral 58 represents a bypass capacitor for the ICs 51 and 52, 59 represents a connector on the side of the printed wiring board 50, and 61 represents a connector on the side of the back panel 60. By inserting the connector 59 for the printed wiring board 50 into the connector 60, the printed wiring board 50 is mounted on the back panel 60. Numeral 62 represents a voltage drop preventing capacitor (to be described later).

As described above, since computer systems with high-reliability are demanded, it has been desired to have a mechanism that enables an exchange and repair operation without stopping the system at a trouble occurrence time.

In other words, the so-called hot insertion and withdrawal operation by which the printed board 50 is exchanged without halting electric power supplied from the back panel 60 during the system operation (in a hot state) has been desired for maintenance and reparation.

However, the capacitors 55, 57, and 58 are mounted at the position where the current flows directly from the main unit on the printed wiring board 50. Hence with the hot insertion and withdrawal operation, when a new printed wiring board 50 is inserted into the back panel 60, a large amount of rush current flows into the capacitors 55, 57, and 58 on the printed wiring board 50.

With abrupt current flowing into the printed wiring board 50, the sudden drop of the voltage on the back panel 60 induces noises, thus affecting harmfully other adjacent printed wiring boards on the back panel 60.

In order to prevent a voltage drop and a noise occurrence due to inflow current to the printed wiring board 50, as shown in FIG. 14, capacitors 62 are respectively connected to the connectors 61 on the back panel 60. The electric charges stores in the capacitor 62 are used at the hot insertion and withdrawal operation.

However, since the capacitor 62 must have a capacitance value several ten times the total value of the capacitors (receiving current flown directly from the side of the back panel 60) mounted on the printed wiring board 50, the limitation on mounting does not allow a capacitor with large capacitance value to be mounted on the back panel 60. In addition, there is a problem in that even if a large capacitor can be mounted, it tends to cause large manufacturing cost and failure occurrence.

Particularly, the capacitors 55 and 57 for the DC-DC converter 54 are extremely large, for example, over a total capacitance value of 1000 µF. With plural DC-DC converters 54 mounted as described above, it has been very difficult to prevent the voltage drop and noise occurrence due to the current inflow at a hot insertion and withdrawal work using the capacitors 62 mounted on the back panel 60.

SUMMARY OF THE INVENTION

The present invention is made to overcome the above mentioned problems. An object of the present invention is to provide a circuit mounting unit that can surely prevent a voltage drop or noise occurrence due to a current inflow at a hot insertion or withdrawal work, without mounting a capacitor with a large capacitance on the main unit side.

In order to achieve the above objects, according to the present invention, the circuit mounting unit is characterized by a first element connected to a main unit via a connector, driven by a predetermined voltage which is supplied from the main unit; a load voltage converter for converting the predetermined voltage from the main unit into a voltage different from the predetermined voltage; a second element driven by the different voltage converted in the load voltage converter, and a first voltage control unit for boosting gradually a voltage supplied from the main unit to the load voltage converter to the predetermined voltage when an insertion or withdrawal exchange operation to the main unit is performed without halting a power supply from the main unit.

According to the present invention, the circuit mounting unit can prevent current from flowing directly into a capacitor with a large capacitance in the load voltage converter at a hot insertion or withdrawal operation time, thus decreasing the rush current. Hence the voltage drop or noise occurrence due to the current inflow can be surely prevented without arranging a large capacitor on the side of the main unit. Hence the capacitor can be mounted with no limitation to the mounting work on the side of the main unit. Moreover, there is an advantage in that the cost needed for the capacitor can be greatly reduced and the failure occurrence due to the capacitor can be remarkably reduced.

BRIEF DESCRIPTION OF THE DRAWINGS

FIGS. 1A, 1B and 1C are block diagrams showings aspects of the present invention;

Figure 1B:
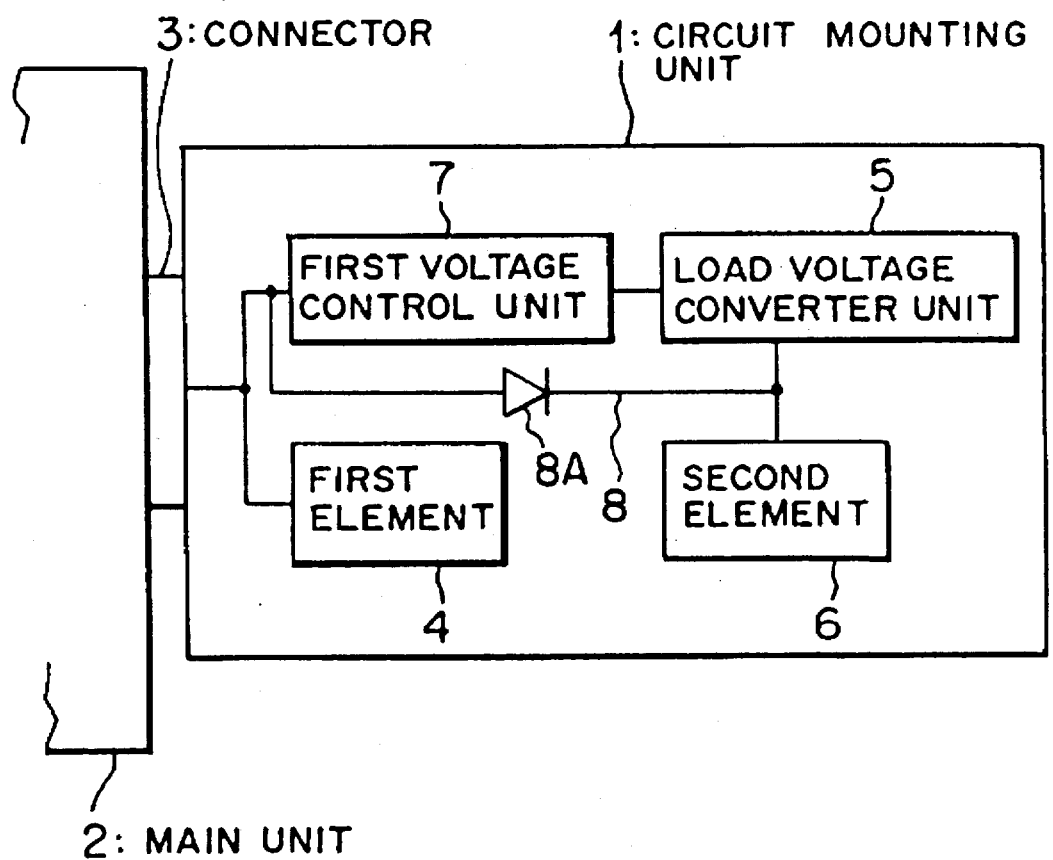

DESCRIPTION OF THE PREFERRED EMBODIMENTS (a) Aspect of the Invention:

FIGS. 1A, 1B and 1C are block diagrams showing aspects of the present invention. Referring to FIG. 1, numeral 1 represents a circuit mounting unit according to the present invention. The circuit mounting unit 1 is connected to the main unit 2 via the connector 3.

On the circuit mounting unit 1 are mounted a first element 4 that is driven on a predetermined voltage supplied from the main unit 2, a load voltage converter 5 that converts the predetermined voltage from the main unit 2 into a voltage different from the predetermined voltage, a second element 6 that is driven on the voltage converted with the load voltage converter 5, and a first voltage control unit 7.

When the circuit mounting unit 1 is inserted into or withdrawn out of the main unit 2 without cutting electric power supply from the main unit 2, the first voltage control unit 7 controls so as to increase gradually a voltage supplied from the main unit 2 to the load voltage converter 5, to a predetermined voltage.

The first voltage control unit 7 consists of a variable resistor that varies from its high resistance state to its low resistance state with an increasing switching voltage added externally, a switching voltage converter that converts an electric power from the main unit 2 into a switching voltage to add the resultant voltage to the variable resistor, and a capacitor that is connected to the ground line via the switching voltage output terminal of the switching voltage converter. The variable resistor in the first voltage control unit 7 may be connected to the electric power supply line running from the main unit 2 to the load voltage converter 5.

An N-channel field effect transistor may be used as the variable resistor in the first voltage control unit 7. A resistor may be connected in parallel to the capacitor in the first voltage control unit 7. The variable resistor and the switching voltage converter constituting the first voltage control unit 7 may be previously formed in n integrated circuit form.

A bypass line that bypasses the first voltage control unit 7 and the load voltage converter 5 is arranged to supply electric power from the main unit 2 to the second element 6. A diode may be connected to the bypass line.

In a board exchange operation, when the circuit mounting unit 1 is inserted into or pulled out of the main unit 2 without stopping electric power supplied from the main unit 2, the second voltage control unit that controls so as to rise gradually a voltage which sneaks from the main unit 2 to the load voltage converter 5 via the bypass line may be arranged on the circuit mounting unit 1.

The second voltage control unit has substantially the same configuration as the first voltage control unit 7 described above. The second voltage control unit consists of a variable resistor that varies from its high resistance state to its low resistance state with An increasing switching voltage added externally, a switching voltage converter that converts an electric power from the main unit 2 via a diode into a switching voltage to add the resultant voltage to the variable resistor, and a capacitor that is connected to the ground line via the switching voltage output terminal of the switching voltage converter. The variable resistor in the second voltage control unit may be connected to the electric power supply line running from the load voltage converter 5 to the second element 6.

An N-channel field effect transistor may be used as the variable resistor in the second voltage control unit. A resistor may be connected in parallel to the capacitor in the second voltage control unit. The variable resistor and the switching voltage converter constituting of the second voltage control unit may be previously formed in an integrated circuit form.

In the circuit mounting unit according to the present invention shown in FIG. 1, when the so-called hot insertion or extraction operation by which the circuit mounting unit 1 is exchangeably inserted into or withdrawn from the main device body 2 without cutting electric power supplied from the main unit 2, the first voltage control unit 7 controls so as to increase gradually a voltage supplied from the main unit 2 to the load voltage converter 5 to a predetermined value. This operation can prevent current from the main unit 2 from rushing directly into the capacitor with a large capacitance value in the load voltage converter 5 at the hot insertion or extraction time.

In the first voltage control unit 7 formed of a variable resistor, a switching voltage converter, and a capacitor, the switching voltage converter converts electric power from the main unit 2 into a switching voltage which is added to the variable resistor. As the switching voltage rises gradually with the time constant (rise time) decided by the capacitance value, the variable resistor varies from its high resistance state to its low resistance state. Thus, a voltage supplied from the main unit 2 to the load voltage converter 5 boosts controllably and gradually to a predetermined value.

Since electric power from the main unit 2 is immediately supplied to the second element 6 via the bypass line and the diode without passing the first voltage control unit 7 and the load voltage converter 5, it is possible to prevent a large potential difference from being produced between the first element 4 and the second element 6 before a voltage supplied from the load voltage converter 5 to the second element 6 will rise sufficiently.

With the bypass line arranged, the second voltage control unit controls so as to boost gradually a voltage which sneaks from the main device body 2 into the load voltage converter 5 via the bypass line in a hot insertion or extraction operation. Thus, it can be prevented that current from the main unit 2 rushes directly into the capacitor arranged on the output side in the load voltage converter 5 at a hot insertion or extraction time.

The second voltage control unit 7 is formed of a variable resistor, a switching voltage converter, and a capacitor. The switching voltage converter converts electric power supplied from the main unit 2 via the bypass line to a switching voltage to apply the resultant to the variable resistor. As the switching voltage rises gradually with the time constant (rise time) decided by the capacitance value of a capacitor, the variable resistor varies its resistance state to its low resistance state. It is controlled to rise gradually a voltage that sneaks from the main unit 2 to the load voltage converter 5 via the bypass line.

A variable resistor can be realized at low price by using an N-channel field effect transistor acting as a variable resistor in the first voltage control unit 7 or the second voltage control unit.

The capacitor in the first voltage control unit 7 or the second voltage control unit is connected in parallel to a resistor. Thus when the circuit mounting unit 1 is extracted from the main unit 2 with the capacitor charged, electric power charged in the capacitor can be consumed by the resistor.

A variable resistor and a switching voltage converter unit forming the first voltage control unit 7 or the second voltage control unit are previously arranged in an integrated circuit form. Thus the second element 6 and the load voltage converter 5 can be easily added merely by mounting the variable resistor and the switching voltage converter each arranged in an integrated circuit form to each additional unit.

According to the circuit mounting unit as shown in FIG. 1, current which flows directly from the main unit 2 into the capacitor with large capacitance arranged in the load voltage converter 5 can be prevented at a hot insertion or extraction time so that the rush current can be minimized. Hence a voltage drop or noise occurrence due to the current inflow can be certainly prevented without mounting a capacitor with large capacitance to the main unit 2. Hence, the capacitor can be mounted without being limited in mounting on the main unit 2. There are advantages in that the capacitor mounting cost can be reduced significantly and the failure occurrence caused by the capacitor is greatly reduced.

It can be prevented that the large potential difference between the first element 4 and the second element 6 arises by immediately supplying electric power from the main unit 2 to the second element 6 via the bypass line and the diode. Hence, with the first element 4 and the second element 6 connected with the interface signal line, a voltage exceeding the absolute maximum rated voltage of the second element 6 is effected so that it can be prevented surely that the second element is destroyed.

Since arranging the bypass pipeline can prevent the main unit 2 from flowing directly current into the output capacitor within the load voltage converter 5, thus reducing the rush current. Hence, the bypass pipeline contributes to further reducing the capacitance of the capacitor on the main unit 2. As described above, a voltage drop and noise occurrence due to current inflow can be surely prevented. The cost of the capacitor on the side of the main unit 2 can be further reduced. The failure occurrence caused by the capacitor can be further reduced.

A variable resistor can be realized at low cost by using an N-channel field-effect transistor acting as a variable resistor. Hence, there is an advantage in that the manufacturing cost of the circuit mounting unit according to the present invention can be reduced.

In the case where the circuit control unit 1 is withdrawn from the main unit 2 with the capacitor in the first voltage control unit 7 or the second voltage control unit charged, electric power charged into the capacitor is consumed by the resistor. Hence, immediately after an operator has once extracted the circuit mounting unit 1 from the main unit 2, even if he should reinsert it erroneously, the first voltage control unit 7 or the second voltage control unit operates normally, whereby the rush current from the main unit 2 can be surely prevented.

Moreover, when the second element 6 and the load voltage converter 5 are newly extended, a variable resistor and a switching voltage converter each in an integrated circuit form are merely mounted on the circuit mounting unit 1 every expansion unit. Thus, the expansion can be very easily dealt with and a decreased number of components and a reduced mounting space can be realized.

It is further noted that in FIGS. 1B and 1C, reference number 8 is attached to a bypass line; and reference number 8A is attached to a diode, while reference number 9 is attached to a second voltage control unit.

(b) First Embodiment

An embodiment according to the present invention will be described below by referring to the attached drawings.

Figure 2:
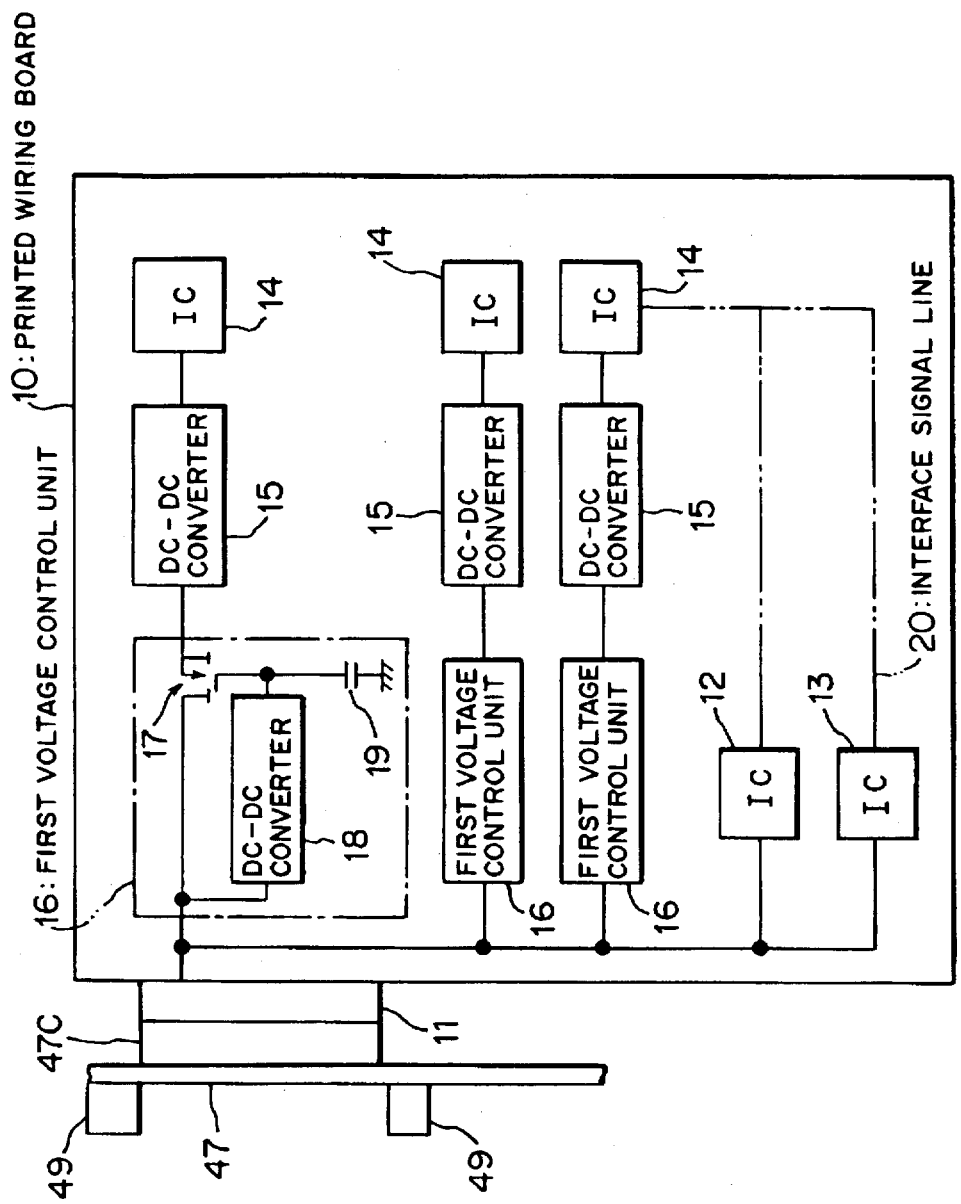
FIG. 2 is a block diagram showing the entire configuration and circuit configuration of a circuit mounting unit (printed wiring board) according to the first embodiment of the present invention.

FIG. 2 is a block diagram showing the entire configuration and the circuit configuration of the circuit mounting unit (printed wiring board) according to the first embodiment of the present invention. Prior to explaining the printed wiring board being a circuit mounting unit according to the present embodiment, let us explain first the system applied to the present embodiment with reference to FIG. 3.

Figure 3:
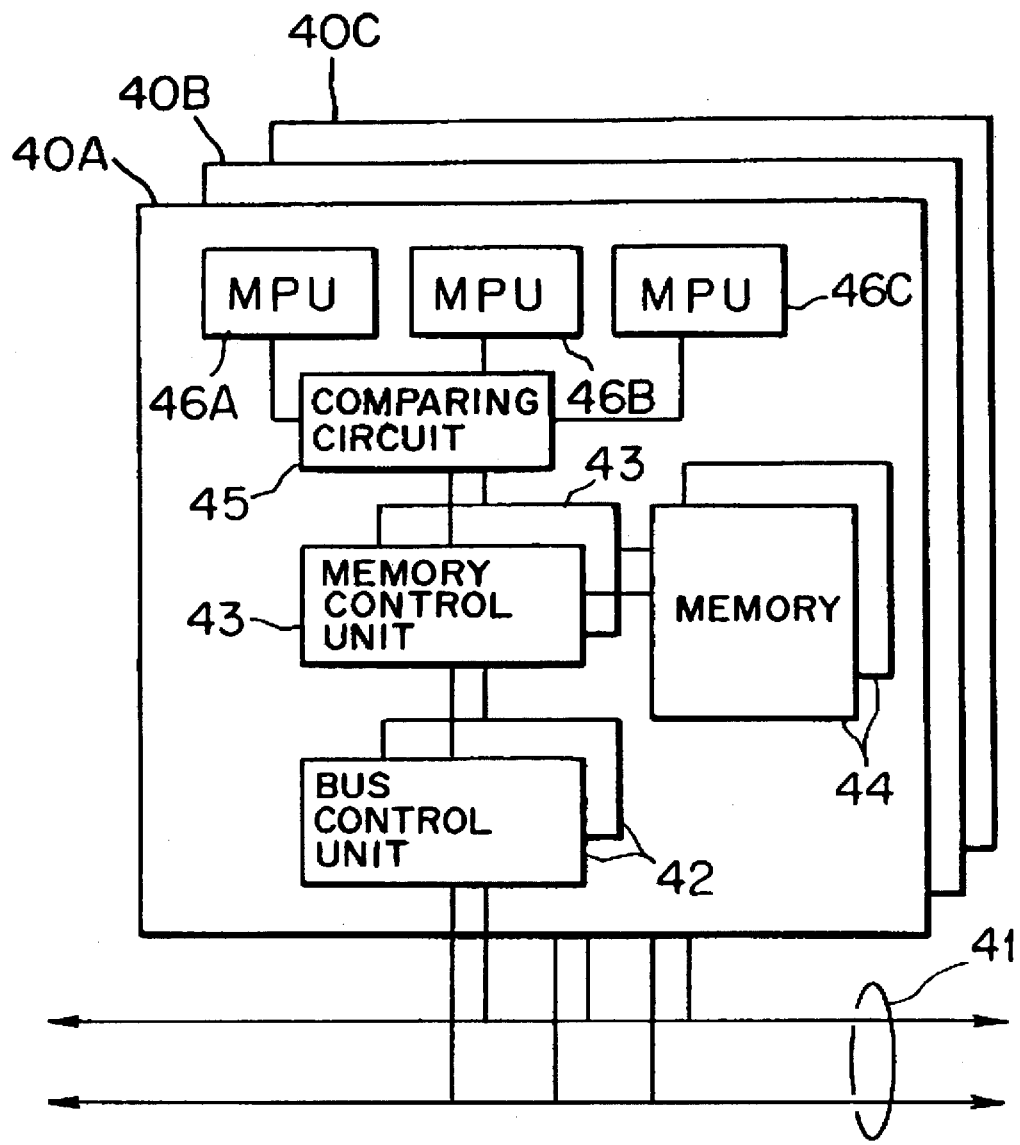
FIG. 3 is a block diagram showing an example of a system embodying the present embodiment.

Referring now to FIG. 3, numerals 40A, 40B, and 40C represent processor modules. The processor modules 40A, 40B, and 40C are respectively connected to the duplex bus 41 to transmit and receive data via the duplex bus 41, and operate as part of the computer system.

Each of the processor modules 40A to 40C consists of a bus control unit 42, a memory control unit 43, a memory 44, a comparator circuit 45, 8rid three MPUs (microprocessor units) 46A, 46B, and 46C.

The bus control unit 42 that acts as an interface to the duplex bus 41 receives various signals from the duplex bus 41 and transmits various signals to the duplex bus 41.

The memory control unit 43 implements a read/write access to the memory 44 which stores various data and programs. The comparator circuit 45 compares the operational results from the three MPUs 46A, 46B, and 46C to perform a triple majority control.

The processor modules 40A, 40B, and 40C, the bus control unit 42, the memory control unit 43, and the memory 44, each of which is duplexed to improve the reliability, are connected respectively to the duplex bus 41.

In the present embodiment, each of the processor modules 40A, 40B, and 40C is previously formed on a printed wiring board (or the circuit mounting unit of the present embodiment). The printed wiring board (to be described later) that is mounted on the back panel on the main unit (computer system) via a connector is connected to the duplex bus 41.

Electric power is supplied from the main unit (back panel) to the processor modules (printed wiring boards) 40A, 40B, and 40C via the connectors to operate various elements.

Figure 4:
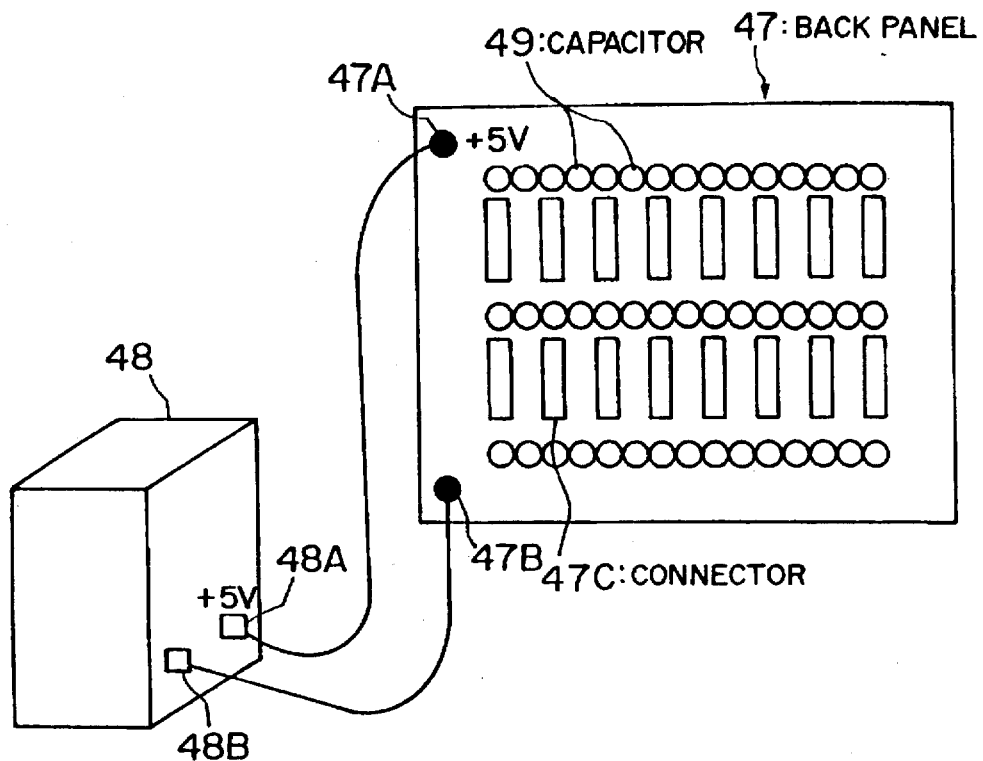
FIG. 4 is a schematic diagram showing the configuration of a power supply system and a back panel according to the present embodiment.

For example, as shown in FIG. 4, plural back panel connectors 47C are equipped on the back panel 47 and the back panel 47 is connected to a power source 48 to supply electric power to each connector 47C. The power source 48, e.g. +5 V battery, has the power source terminal 48A connected to the power source terminal 47A of the back panel 47 and the ground terminal 48B connected to the ground terminal 47B thereof.

Capacitors 49 mounted on the back panel 47 are connected respectively to the corresponding connectors 47C (to be described later with FIG. 5) to prevent the voltage drop end noise occurrence described above.

Figure 5:
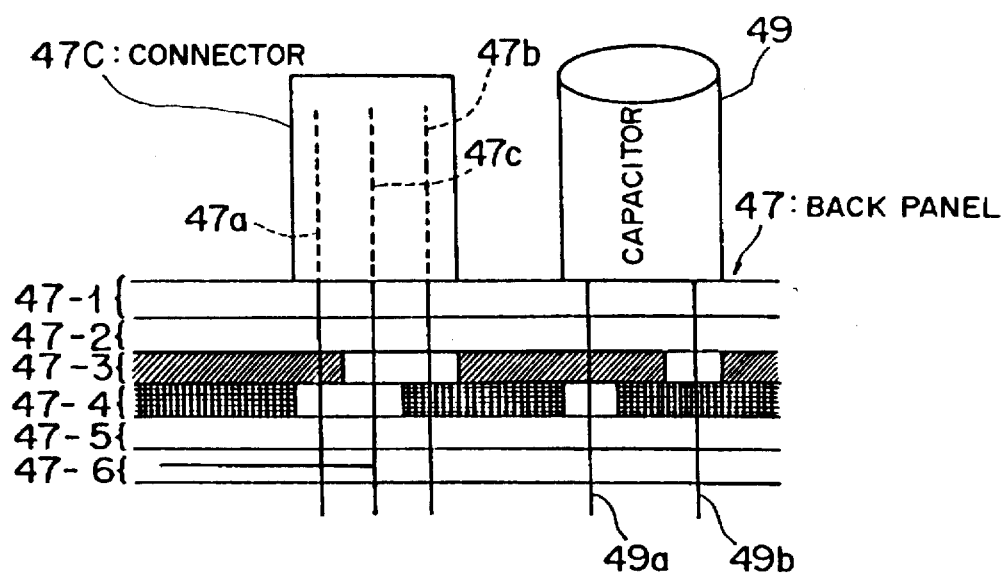
FIG. 5 is a cross-sectional view schematically showing a connector and a capacitor mounted on a back panel according to the present embodiment.

The back panel 47, as shown in FIG. 5, has a laminated structure formed of the first layer 47-1 to the sixth layer 47-6. In order to achieve a predetermined function, a pattern is formed on each of the layers 47-1 to 47-6. For example, the pattern of the third layer 47-3 is connected to the power source terminal 47A while the pattern of the fourth layer 47-4 is connected to the ground terminal 47B.

The power source pin 47a of the connector 47C and one pin 49a of the capacitor 49 are connected to pattern of the third layer 47-3. The ground pin 47b of the connector 47C and the other pin 49b of the capacitor 49 are connected to the pattern of the fourth layer 47-4. The capacitor 49 to which a voltage of +5 V is always applied stores a predetermined amount of electric charges, thus coping with a voltage drop due to insertion or extraction under a hot state.

In the back panel 47, the sixth layer 46-6 functions as the duplex bus 41 to send various signals. Plural signal pins 47c (but only one signal pin is shown in FIG. 5) of the connector 47C are connected to the pattern formed on the sixth layer 47-6.

Figure 6:
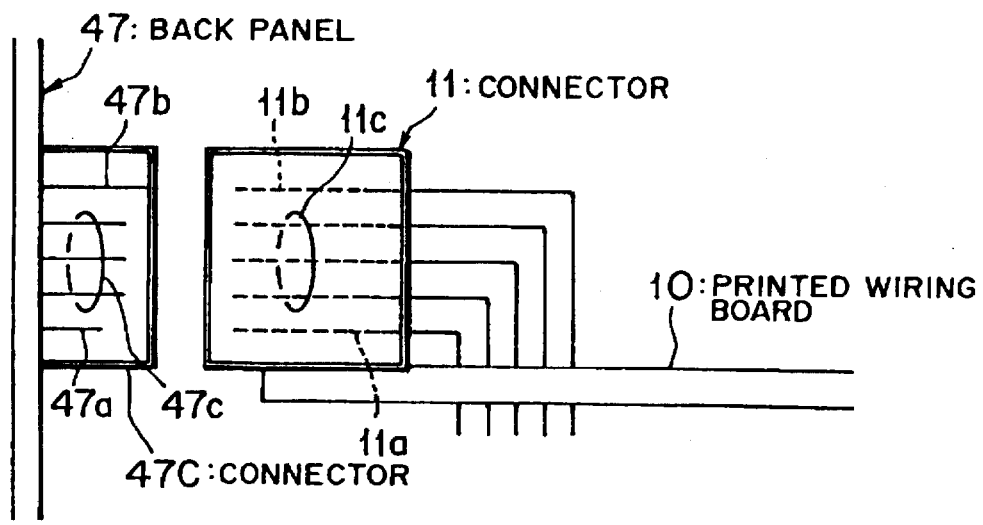
FIG. 6 is a schematic side view for explaining a connection between a back panel connector and a printed wiring board connector according to the present embodiment.

As shown in FIG. 6, a printed wiring board connector 11 is attached on the printed wiring board (circuit mounting unit) 10 that acts as, for example, each of the processor modules 40A to 40-C. The connector 11 connected to the back panel connector 47C is prepared to connect the printed wiring board 10 to the back panel 47.

The connector 11 has the power source pin 11a connected to the power source pin 47a of the back panel connector 47C, the ground pin 11b connected to the ground pin 47b of the back panel connector 47C, and the signal pins 11c connected to the signal pins 47c of the back panel connector 47C. The connector 47C is coupled to the connector 11 to connect respectively the power source pin 47a to the power source pin 11a, the ground pin 47b to the ground pin 11b, and the signal pins 47c to the signal pins 11c.

As shown in FIG. 6, the back panel connector 47C includes the ground pin 47b having the largest length, the signal pins 47C having a middle length, and the power source pin 47a having the shortest length, whereas the printed wiring board connector 11 includes pins 11a to 11c having the same length.

Therefore, when the connector 47C is coupled to the connector 11, a time difference occurs in the contact operations between pins 47a and 11a, between pins 47b and 11b, and between pins 47c and 11c. That is, the ground pin 47b is first connected to the ground pin 11b. Next the signal pins 47c are connected to the signal pins 11c. Finally the power source pin 47a is connected to the power source pin 11a.

Since connecting first the ground pin 47b to the ground pin 11b establishes a stable voltage, it can be prevented that various elements mounted on the printed wiring board 10 become destructive.

Figure 7:
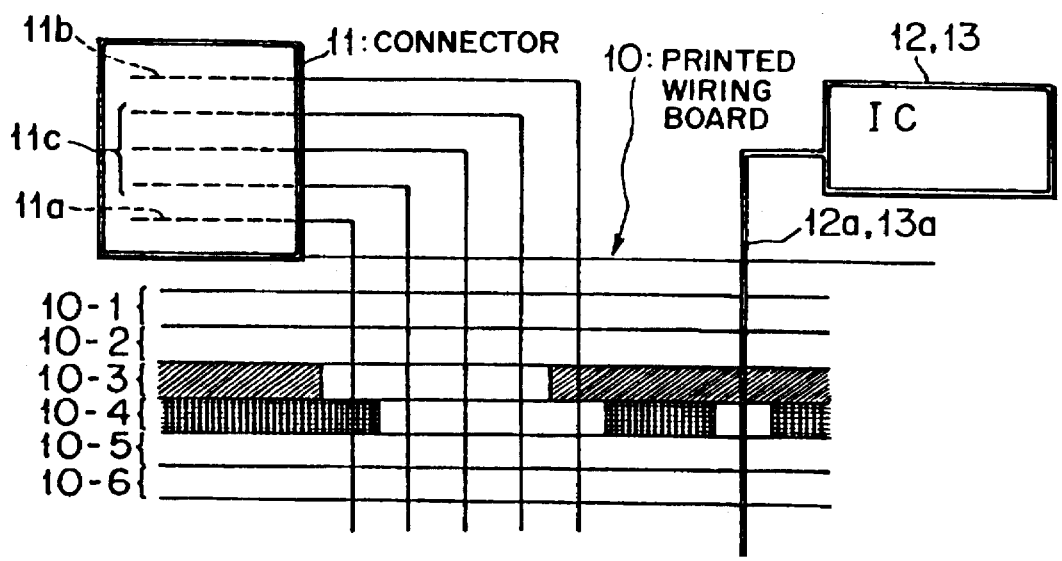
FIG. 7 is a schematic cross-sectional view for explaining a power supply mode on the printed wiring board, according to the present embodiment.

Like the back panel 47, the printed wiring board 10, as shown in FIG. 7, has a multiple layered structure formed of the first layer 10-1 to the sixth layer 10-6. A pattern is formed on each of the layers 10-1 to 10-6 to implement a predetermined function. The pattern of the third layer 10-3, for example, is connected to the power source pin 11aof the connector 11. The pattern of the fourth layer 10-4 is connected to the ground pin 11b of the connector 11.

As a result, the printed wiring board 10 is mounted to the back panel 47 via the connectors 11 and 47C to supply electric power from the back panel 47 to the printed wiring board 10. Various elements such as ICs 12 And 13 are mounted on the printed wiring board 10 to connect the power source pins 12a and 13a to a pattern of the third layer 10-3. Thus, electric power is supplied from the back panel 47 to the elements on the printed wiring board 10 so that the elements are operated.

Two type elements operated on different voltages are mounted on the printed wiring board 10 according to the present embodiment, as shown in FIG. 2.

Now, suppose that the ICs (first elements) 12 and 13, each of which consists of the bus control unit 42, the memory control unit 43, the memory 44, and the comparator circuit 45, as shown in FIG. 3, are operated on the voltage (e.g. +5 V) supplied from the back panel 47 without any change, and three ICs (second elements) 14 acting as MPUs 46A to 46C are operated on, for example, +5.3 V. In this case, as shown in FIG. 2, a DC-DC converter (load voltage converter) 15 that converts the voltage (+5 V) supplied from the back panel 47 into the different voltage (+5.3 V) is connected as the front stage of each of the ICs 14.

Moreover, as shown in FIG. 2, the first voltage control unit 16 is arranged in front of the DC-DC converter 15 (or between the DC-DC converter 15 and the connector 11).

The first voltage control unit 16 controls to boost gradually the voltage supplied from the back panel 47 to the DC-DC converter 15 to a predetermined voltage (+5 V) at a hot insertion or extraction time. The first voltage control unit 16, for example, consists of an N-channel FET (N-channel field-effect transistor) 17, a DC-DC converter 18, and a capacitor 19.

The N-channel FET 17 acts as a variable resistor that varies from a high resistance state (∞) to a low resistance state (0) as the switching voltage supplied to the gate rises. The drain to source path is arranged in the power supply line running from the back panel 47 to the DC-DC converter 15.

FETs are generally classified by P-channel FETs and N-channel FETs 17 used in the present embodiment. The potential difference between the gate and source electrodes is important to select its on-state (low resistance state) and its off state (high resistance state).

To turn on the P-channel FET, a voltage lower than the source voltage is applied to the gate thereof. The potential difference is represented as Vgs. To turn on the P-channel FET, the potential difference Vgs must be generally set to lower than −5 V. To turn completely off the P-channel FET, the potential difference Vgs must be set to higher than −1 V. With the potential difference Vgs of −1 V to −5 V, the P-channel FET becomes uncertain state.

In the reverse manner to the P-channel FET, in order to turn on the N-channel FET 17, a voltage higher than the source voltage is applied to the gate thereof. The N-channel FET 17 turns on at a potential difference Vgs of higher than +5 V, whereas it turns off at a potential difference of lower than +1 V.

Figure 8:
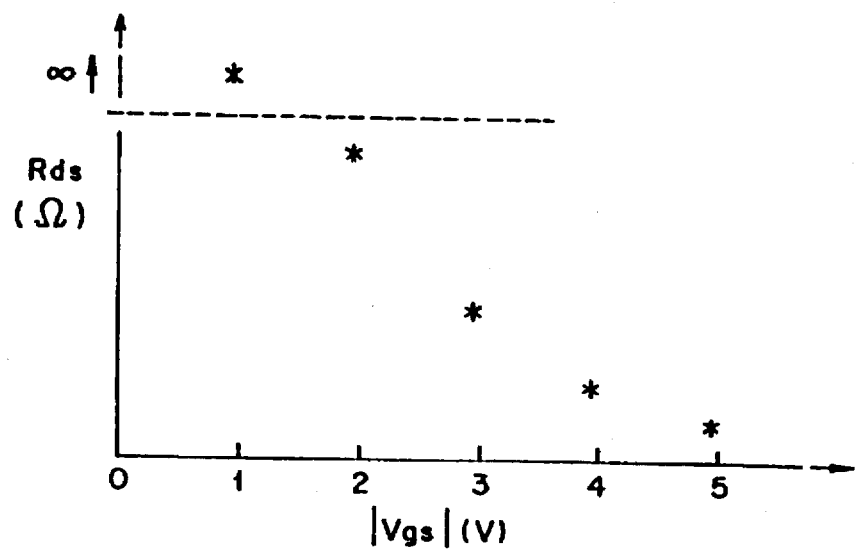
FIG. 8 is a graph showing the characteristics of a FET used in the present embodiment.

FIG. 8 shows the relationship (FET characteristic) between the potential difference Vgs and the drain to source resistance value Rds. When the resistance value Rds between the drain and the source becomes a low impedance (low resistance), the FET is turned on. When the resistance value Rds between the drain and the source becomes a high impedance (high resistance), the FET is turned off.

In the power supply system of +5 V according to the present embodiment, it is difficult to establish the on or off state of the P-channel FET. In comparison with the N-channel FET, there is a disadvantage in that the P-channel FET shows its high resistance in an on-state and becomes costly in manufacture. For that reason, N-channel FETs are used as a variable resistor in this present embodiment.

Figure 14:
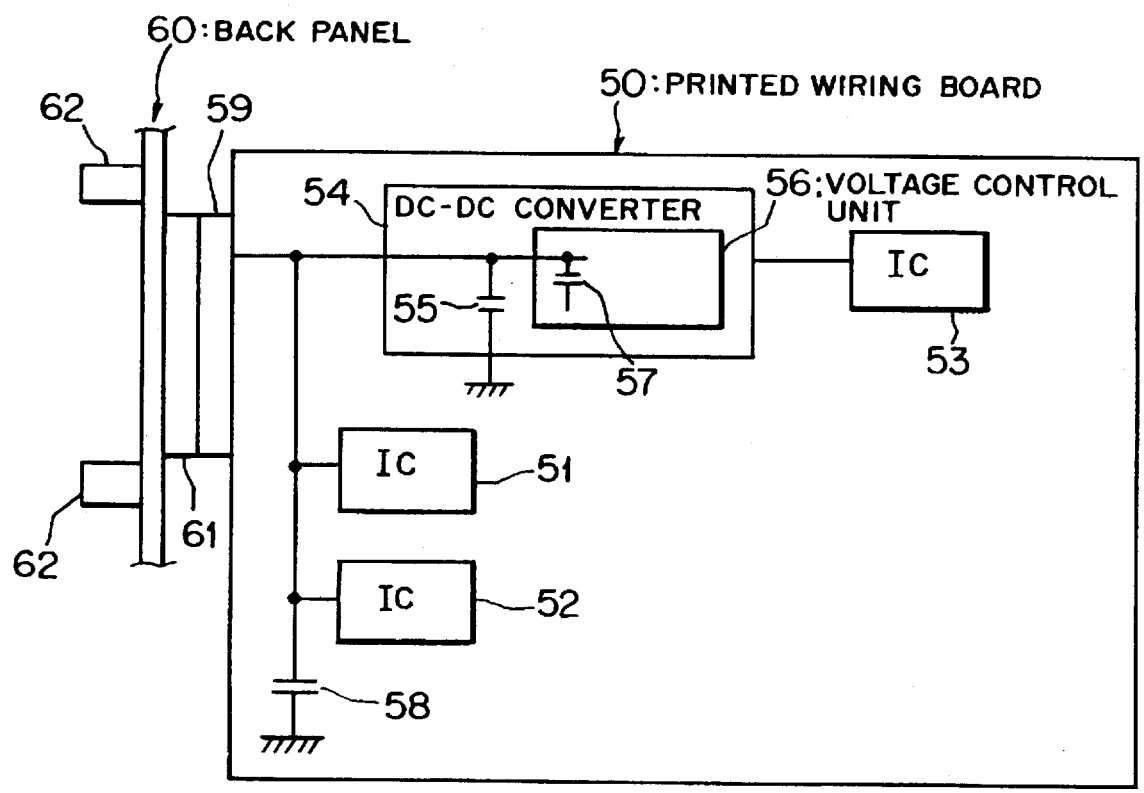
FIG. 14 is a block diagram showing the entire configuration and the circuit configuration of a general circuit mounting unit (printed wiring board).

The DC-DC converter 18 converts electric power from the back panel 47 into a predetermined switching voltage to apply to the gate of the N-channel FET 17. The DC-DC converter 18 is formed in the same way as the DC-DC converter 15 used as the load voltage converter. However, since the level of the conversion voltage is lower than that of the DC-DC converter 15, the bypass capacitor (refer to numeral 55 in FIG. 14) connected to the input of the DC-DC converter 18 has a capacitance value much smaller than that to the DC-DC converter 15. For example, the capacitance value of the bypass capacitor for the DC-DC converter 18 is about 0.1 µF.

The capacitor 19, which is connected between the switching voltage output terminal of the DC-DC converter 18 and the ground line, determines the rise time (time constant) of the switching voltage (to be described later). The capacitance value is, for example, about 0.1 µF.

The N-channel FET 17 and the DC-DC converter 18 forming the first voltage control unit 16 may be previously formed as an LSI acting as a single component. Power management switch MB3802 can be used as such a component.

FIG. 2 shows three ICs 14 mounted as the second element. However, one, two, or more than four ICs 14 may be mounted. In any cases, both the first voltage control unit 16 and the DC-DC converter 15 are associated with each IC 14, as shown in FIG. 2.

In the above configuration, with the printed wiring board 10 mounted to the back panel 47 via the connectors 47C and 11 to insert into or extract from the printed wiring board 10 in a hot state, the DC-DC converter 18 converts electric power supplied from the back panel 47 into a predetermined switching voltage applied to the gate N-channel FET 17. In this case, the switching voltage rises linearly with the time constant (rise time) decided by the capacitance value of the capacitor 19.

Figure 9:
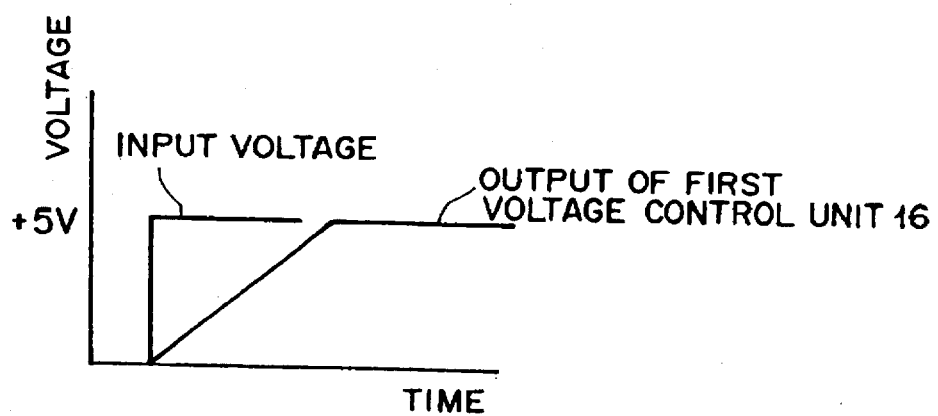
FIG. 9 is a graph showing a voltage to time characteristic of the first voltage control unit according to the present embodiment.

As the switching voltage rises up, the N-channel FET 17 varies its resistance from a high state to a low state. Thus as shown in FIG. 9, the voltage supplied from the back panel 47 to the DC-DC converter 15 is controlled so as to increase gradually to a predetermined voltage (e.g. an input voltage of +5 V to the printed wiring board 10). In FIG. 9, the slope of the output voltage of the first voltage control unit (N-channel FET 17) 16 at the rising time is determined by the capacitance value of the capacitor 19. Thus the voltage is applied linearly to the IC 14, or a load of the DC-DC converter 15, according to the voltage rise shown in FIG. 9.

At an active insertion/withdrawal operation, it can be certainly prevented that current from the back panel 47 flows directly into the DC-DC converter (load voltage converter) 15 including a large bypass capacitor so that the rush current to the printed wiring board 10 becomes small. Hence while the voltage drop and noise occurrence due to the current inflow can be surely prevented on the side of the back panel 47, a hot insertion or withdrawal operation of the printed wiring board 10 can be performed without mounting the large capacitor 49 to the back panel 47.

The capacitor 49 can be mounted on the back panel 47 without being restricted in mounting. The cost for the capacitor 49 and failure occurrence caused by the capacitor 49 can be reduced greatly. Moreover, the use of the N-channel FET 17 can realize a variable resistor at low cost, thus greatly reducing the manufacturing cost of the printed wiring board 10.

The N-channel FET 17 and the DC-DC converter 18 each forming the first voltage control unit 16 are previously formed as an LSI and a single component. This feature can facilitate extending the IC 14 and the DC-DC converter 15 and reduce the number of components and the mounting area.

As shown in the phantom line in FIG. 2, in the case where the interface signal line 20 connects the ICs 12 and 13 operated on the voltage from the back panel 47 without any change with the ICs 14 each operated on a voltage converted with the DC-DC converter 15, the following problems may arise.

Figure 10A:
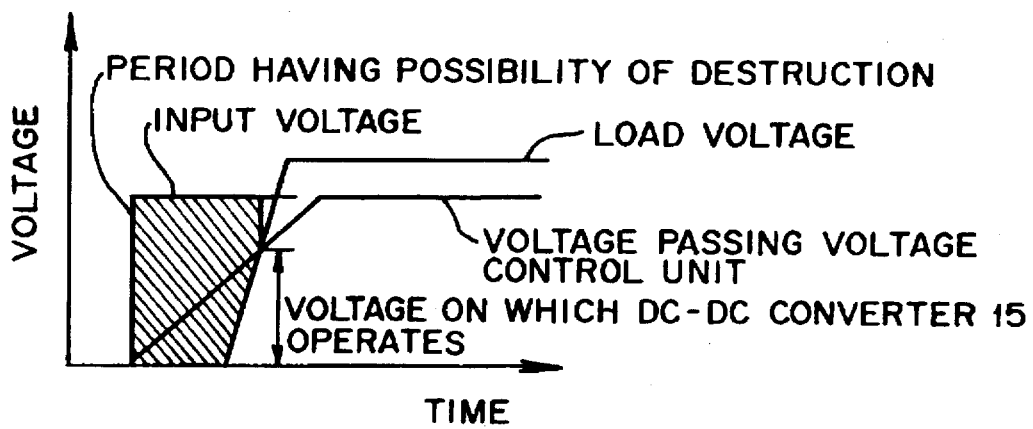
FIG. 10(a) is a graph showing voltage vs. time characteristics of the circuit mounting unit, according to the present embodiment.
Figure 10B:
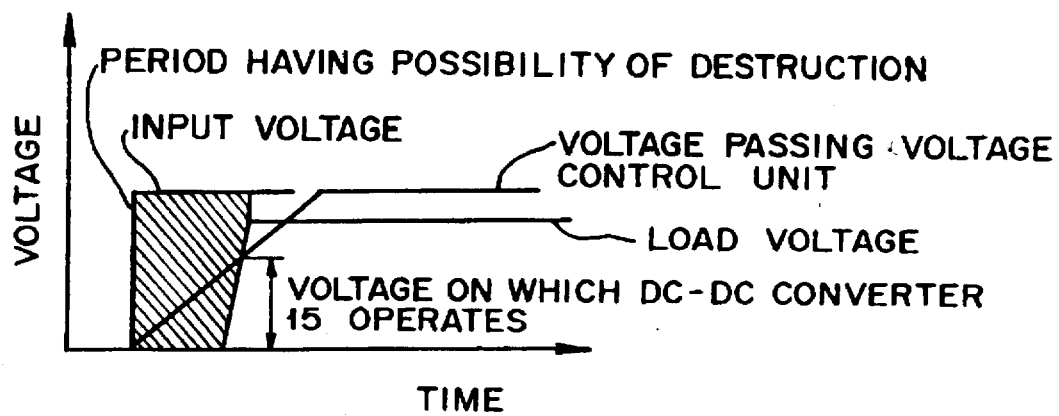
FIG. 10(b) is a graph showing a voltage vs. time characteristic of the circuit mounting unit, according to the present embodiment.

As shown in FIGS. 10(a) and 10(b), the input voltage from the back panel 47 is immediately supplied to the ICs 12 and 13. On the other hand, the suitable load voltage is not supplied to the IC 14 till the first voltage control unit 16 boosts the voltage applied to the DC-DC converter 15 by the first voltage control unit 16 to a predetermined value. Hence when a voltage is produced on the interface signal line 20, the IC 14 to which a voltage is not applied may be applied with a voltage exceeding the absolute maximum rated voltage of the IC 14, thus being liable to be destroyed.

FIG. 10(a) shows the case where the load voltage to be converted with the DC-DC converter 15 is higher than the input voltage. FIG. 10(b) shows the case where the load voltage to be converted with the DC-DC converter 15 is lower than the input voltage. In either case, the IC 14 may be destroyed by the time the load voltage boosts to the suitable value (the shaded portions in figures).

Figure 11A:
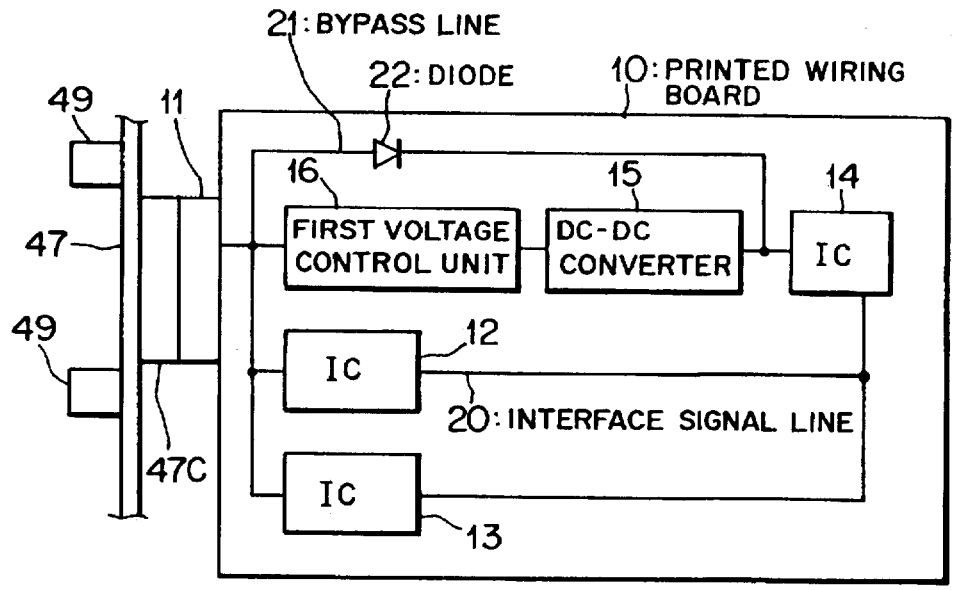
FIG. 11(a) is a block diagram showing the entire configuration and the circuit configuration of the first modification of the circuit mounting unit, according to the first embodiment of the present invention.
Figure 11B:
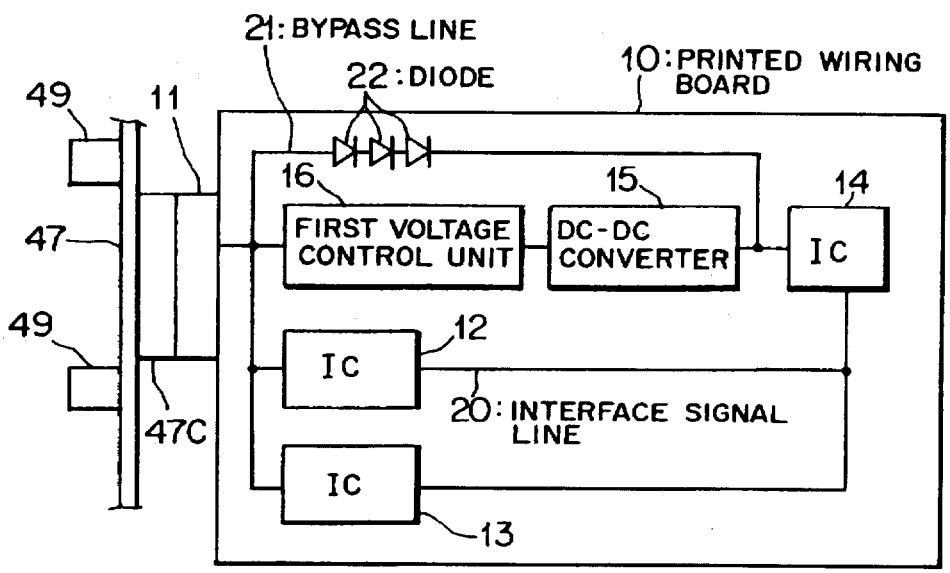
FIG. 11(b) is a block diagram showing the entire configuration and the circuit configuration of the first modification of the circuit mounting unit, according to the first embodiment of the present invention.

According to the present embodiment, as shown in FIGS. 11(a) and 11(b), a bypass line 21 that bypasses the first voltage control unit 16 and the DC-DC converter 15 to supply electric power from the back panel 47 directly to the IC 14 is arranged on the printed wiring board 10. A suitable number of diodes 22 are inserted in the bypass line 22.

FIG. 11(a) shows the case where the load voltage to be converted with the DC-DC converter 15 is higher than the input voltage. In this example, only single diode 22 is arranged. FIG. 11(b) shows the case where the load voltage to be converted with the DC-DC converter 15 is lower than the input voltage. In this example, three diodes 22 are serially connected. The voltage drop of the diodes 22 is used to reduce the initial voltage supplied to the IC 14.

Figure 12A:
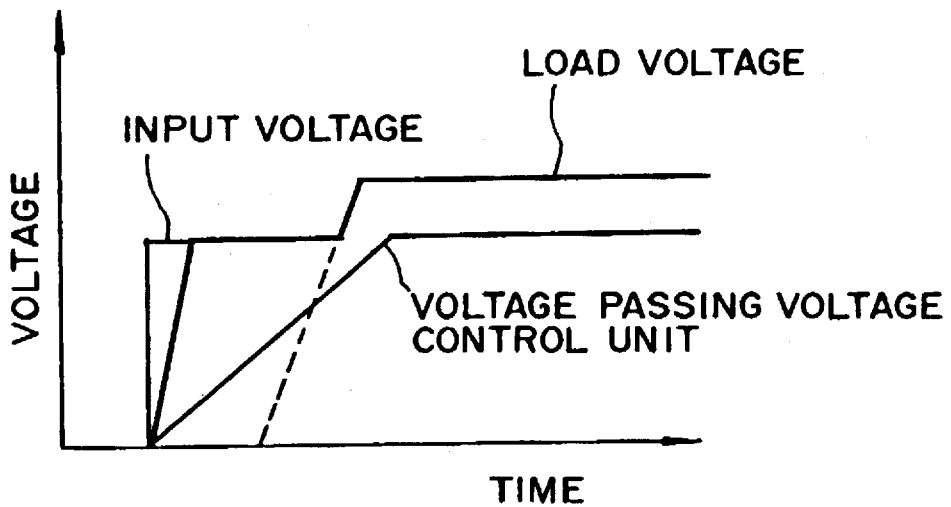
FIG. 12(a) is a graph showing voltage vs. time characteristics of the circuit mounting unit shown in FIG. 11(a)

In the printed wiring board 10 with the above configuration shown in FIG. 11(a), as shown in FIG. 12(a), when the printed wiring board 10 is inserted or extracted in a hot state, the bypass line 21 supplies the input voltage from the back panel 47 to the IC (load) 14 via the diode 22 till the voltage of the first voltage control unit 16 rises slantingly up and the DC-DC converter 15 starts its operation. When the DC-DC converter 15 starts its operation, a normal voltage is applied to the IC 14 because a voltage higher than the input voltage is applied to the IC 14, thus not effecting the diode 22.

Figure 12B:
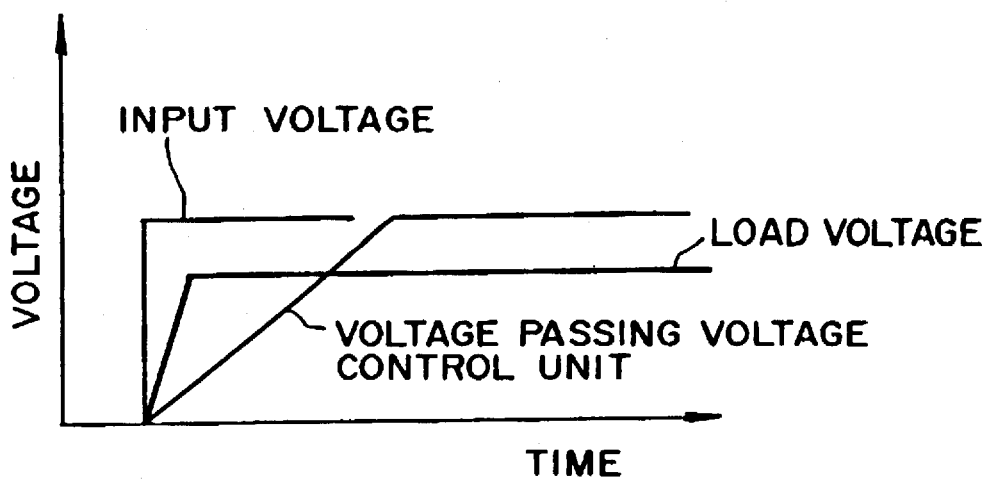
FIG. 12(b) is a graph showing voltage vs. time characteristics of the circuit mounting unit shown in FIG. 11(b)

In the printed wiring board shown in FIG. 11(b), as shown in FIG. 12(b), when the printed wiring board 10 is inserted or extracted in a hot state, the bypass line 21 supplies the input voltage reduced to a predetermined value from the back panel 47 to the IC (load) 14 via the three diodes 22 till the voltage of the first voltage control unit 16 rises up with a slope and the DC-DC converter 15 starts its operation. When the DC-DC converter 15 starts its operation, a normal voltage is applied to the IC 14 because the IC 14 operates on a predetermined voltage converted with DC-DC converter 15.

In the printed wiring board 10 shown in FIGS. 11(a) and 11(b), it can be prevented that there is a large potential difference between the ICs 12 and 13, and the IC 14 before a voltage supplied from the DC-DC converter 15 to the IC 14 rises sufficiently. With the interface signal line 20 connected to the ICs 12 and 13, and the IC 14, a voltage exceeding the absolute maximum rated voltage of the IC 14 is applied to the IC 14 so that it can be prevented that the IC 14 is destroyed.

In the DC-DC converter 15, the capacitor 29 is normally connected to the output stage to smooth the output from the DC-DC converter 15. In this case, with the bypass line 21 arranged as shown in FIGS. 11(a) and 11(b), rush current may sneak from the back panel 47 via the bypass line 21 when the printed wiring board 10 is inserted or withdrawn in hot state.

Figure 13:
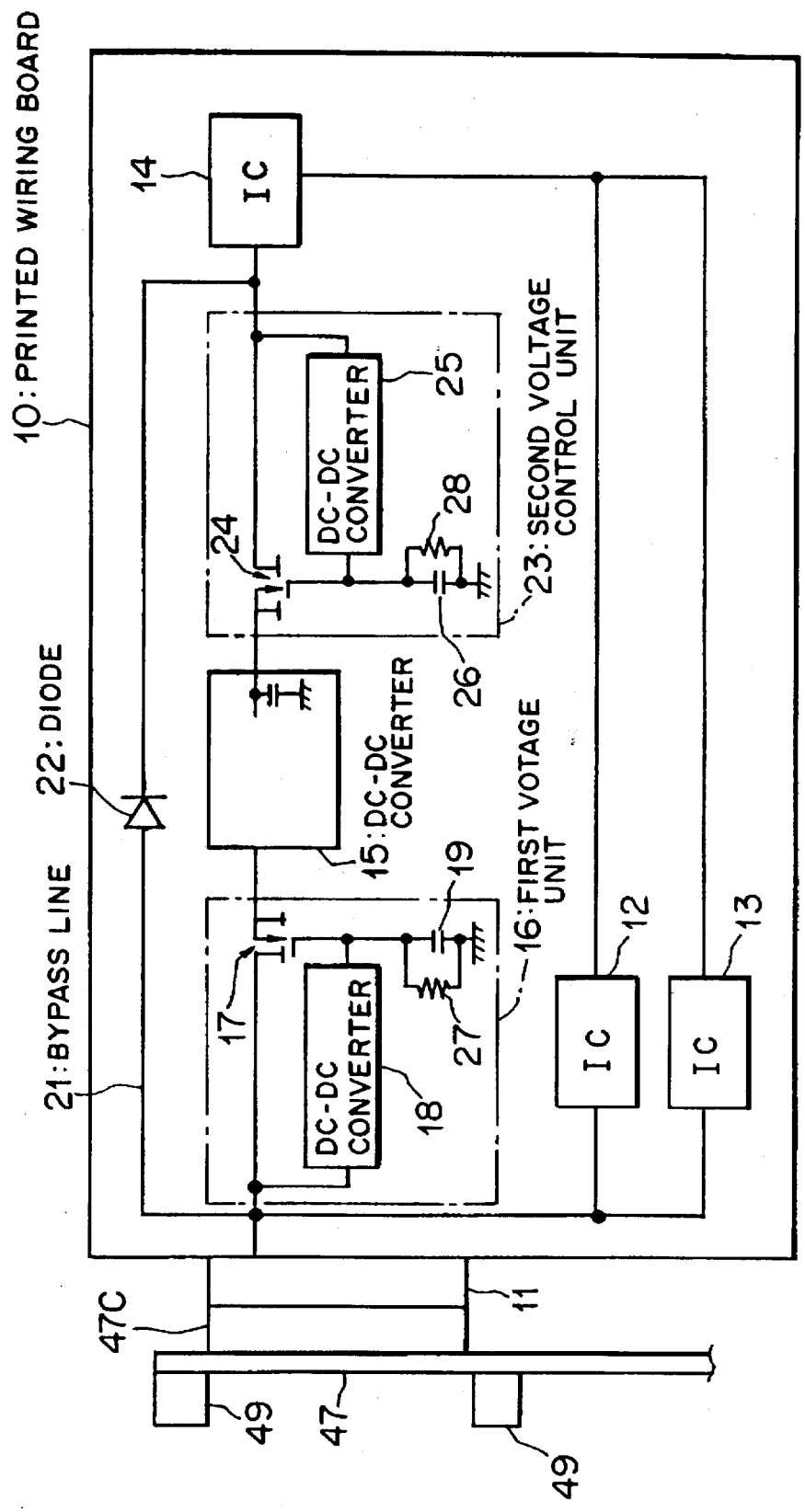
FIG. 13 is a block diagram showing the entire configuration and the circuit configuration of the second modification of the circuit mounting unit, according to the first embodiment of the present invention.

According to the present embodiment, as shown in FIG. 13, the second voltage control unit 23 is arranged behind the DC-DC converter 15 and between the DC-DC converter 15 and the end of the bypass line 21.

The second voltage control unit 23 controls in such a manner that the voltage that is applied from the back panel 47 to the DC-DC converter 15 via the bypass line 21 rises gradually at a hot insertion or extraction time. Like the first voltage control unit 16, the second voltage control unit 23 consists of, for example, an N-channel FET 24, the DC-DC converter 25, and the capacitor 26.

Like the N-channel FET 17, the N-channel FET 24 acts as a variable resistor that varies from its high resistance state ($\infty$) to its low resistance state (0), with an increasing switching voltage applied to the gate thereof. The source-drain path is inserted in the power supply line running from the DC-DC converter 15 to the IC 14.

The DC-DC converter 25 converts electric power obtained from the back panel 47 via the bypass line (diode 22) 21 into a predetermined switching voltage which is applied to the gate of the N-channel FET 23. Like the DC-DC converter 18, the DC-DC converter 25 has a conversion voltage level lower than the DC-DC converter 15. Hence, the capacitance of the bypass capacitor arranged to the DC-DC converter 25 is extremely smaller than that of the bypass capacitor (refer to numeral 55 in FIG. 14).

Moreover, the capacitor 26 is arranged between the switching voltage output terminal of the DC-DC converter 25 and the ground line to decide the switching voltage rise time (time constant) as described above. The capacitor 26 has, for example, as large as 0.1 $\mu$F.

The first voltage control unit 16 formed of the N-channel FET 17 and the DC-DC converter 18 can be previously formed in n LSI form, or a single component.

In the present embodiment, as shown in FIG. 13, a resistor 27 with a suitable resistance value is connected in parallel to the capacitor 19 while a resistor 28 with a suitable resistance value is connected in parallel to the capacitor 26.

In the printed wiring board 10 with the above configuration shown in FIG. 13, where the printed wiring board 10 is mounted to the back panel 47 via the connectors 47C 11 to subject to a hot insertion or withdrawal operation, the DC-DC converter 25 converts electric power supplied from the back panel 47 via the bypass line (diode 22) 21 into a predetermined switching voltage to apply to the gate of the N-channel FET 24. In this case, the switching voltage rises linearly up with the time constant (rise time) determined by the capacitance value of the capacitor 26.

As the switching voltage rises up, the N-channel FET 24 varies its high resistance state to its low resistance state. As a result, a voltage that sneaks from the back panel 47 to the output of the DC-DC converter 15 via the bypass line 21 rises gradually up.

Hence, with the bypass line 21 arranged, it can be prevented that current from the back panel 47 rushes directly into the output capacitor 29 for the DC-DC converter 15 via the bypass line 21, whereby the rush current can be surely minimized.

The N-channel FET 24 and the DC-DC converter 25 constituting the second voltage control unit 23 are previously formed as an LSI and a single component. As a result, the IC 14 and the DC-DC converter 15 can be easily expanded while the number of components and the mounting area can be reduced.

The capacitor 19 of the first voltage control unit 16 is connected in parallel to the resistor 27. The capacitor 26 of the second voltage control unit 23 is connected in parallel to the resistor 28. When the printed wiring board 10 with the capacitors 19 and 26 charged is pulled off out of the back panel 47, the electric power charged in the capacitor 19 flows to the ground through the resistor 27 while the electric power charged in the capacitor 26 flows to the ground through the resistor 28.

In other words, even if the printed wiring board 10 is once pulled off out of the back panel 47 with the capacitors 19 and 26 fully charged, the resistor 27 consumes and removes the charges stored by the capacitor 19 And the resistor 28 consumes and removes the charges stored by the capacitor 26.

In other words, even if an operator reinserts erroneously the printed wiring board 10 into the back panel 47 immediately after a printed wiring board extraction operation, the capacitors 19 and 26 operate normally. Since each of the first voltage control unit 16 and the second voltage control unit 23 acts as a rush current preventing circuit, the current rushing from the back panel 47 to the printed wiring board 10 can be prevented certainly.

In the above embodiment, the case where elements operated on two kinds of voltages has been described. However, the present invention should not be limited only to the above-mentioned embodiment. In the same manner, the case where elements operated on three kinds of voltages are mounted on the printed wiring board 10 is applicable to the present invention. Needless to say, the same function effect as those in the above embodiment can be obtained.

In the above described embodiment, as shown in FIG. 3, the processor modules 40A (–40C) are formed on the printed wiring board 10, and the circuit mounting unit is formed of a printed wiring board. However, it should be noted that the present invention should not be limited to only the above-mentioned embodiment.

What is claimed is:

1. A circuit mounting unit, comprising:
    a first element connected to a main unit via a connector, driven by a first voltage which is supplied from said main unit;
    a load voltage converter for converting said first voltage from said main unit into a second voltage different from said first voltage;
    a second element driven by said second voltage converted by said load voltage converter; and
    a first voltage control unit for boosting gradually a voltage supplied from said main unit to said load voltage converter into said first voltage when an insertion operation to said main unit is performed without halting a power supply from said main unit,
    said first control unit including:
        a variable resistor that varies from a high resistance state thereof to a low resistance state thereof as a switching voltage externally added increases,
        a switching voltage converter that converts an electric power from said main unit into said switching voltage to supply to said variable resistor, and
        a capacitor inserted between an output terminal from said switching voltage of said switching voltage converter and a ground line,
        said variable resistor in said first voltage control unit being connected to a power supply line from said main unit to said load voltage converter.

2. The circuit mounting unit according to claim 1, wherein said variable resistor in said first voltage control unit comprises an N-channel field effect transistor.

3. The circuit mourning unit according to claim 2, further comprising a resistor which is connected in parallel to said capacitor in said first voltage control unit.

4. The circuit mounting unit according to claim 3, wherein said variable resistor and said switching voltage convertor are previously formed in an integrated circuit form.

5. The circuit mounting unit according to claim 2, wherein said variable resistor and said switching voltage converter which constitute said first voltage control unit are previously formed in an integrated circuit form.

6. The circuit mounting unit according to claim 1, further comprising a resistor which is connected in parallel to said capacitor in said first voltage control unit.

7. The circuit mounting unit according to claim 6, wherein said variable resistor and said switching voltage converter are previously formed in an integrated circuit form.

8. The circuit mounting unit according to claim 1, wherein said variable resistor and said switching voltage converter which constitute said first voltage control unit are previously formed in an integrated circuit form.

9. A circuit mounting unit, comprising:
    a first element connected to a main unit via a connector, driven by a first voltage which is supplied from said main unit;
    a load voltage converter for converting said first voltage from said main unit into a second voltage different from said first voltage;
    a second element driven by said second voltage converted by said load voltage converter;
    a first voltage control unit for boosting gradually a voltage supplied from said main unit to said load voltage converter into said first voltage when an insertion operation to said main unit is performed without halting a power supply from said main unit;
    a bypass line for bypassing said first voltage control unit and said load voltage converter to supply an electric power from said main unit to said second element; and
    a diode connected to said bypass line.

10. A circuit mounting unit according to claim 9, wherein said first control unit comprises:
    a variable resistor that varies from a high resistance state thereof to a low resistance state thereof as a switching voltage externally added increases;
    a switching voltage converter that converts an electric power from said main unit into said switching voltage to supply to said variable resistor; and
    a capacitor inserted between an output terminal for said switching voltage of said switching voltage converter and a ground line,
    said variable resistor in said first voltage control unit being connected to a power supply line from said main unit to said load voltage converter.

11. The circuit mounting unit according to claim 10, wherein said variable resistor in said first voltage control unit comprises an N-channel field effect transistor.

12. The circuit mounting unit according to claim 11, further comprising a resistor which is connected in parallel to said capacitor in said first voltage control unit.

13. The circuit mounting unit according to claim 12, wherein said variable resistor and said switching voltage converter which constitute said first voltage control unit are previously formed in an integrated circuit form.

14. The circuit mounting unit according to claim 11, wherein said variable resistor and said switching voltage converter which constitute said first voltage control unit are previously formed in an integrated circuit form.

15. The circuit mounting unit according to claim 10, further comprising a resistor which is connected in parallel to said capacitor in said first voltage control unit.

16. The circuit mounting unit according to claim 15, wherein said variable resistor and said switching voltage converter which constitute said first voltage control unit are previously formed in an integrated circuit form.

17. The circuit mounting unit according to claim 10, wherein said variable resistor and said switching voltage converter which constitute said first voltage control unit are previously formed in an integrated circuit form.

18. A circuit mounting unit, comprising:
- a first element connected to a main unit via a connector, driven by a first voltage which is supplied from said main unit;
- a load voltage converter for converting said first voltage from said main unit into a second voltage different from said first voltage;
- a second element driven by said second voltage converted by said load voltage converter;
- a first voltage control unit for boosting gradually a voltage supplied from said main unit to said load voltage converter into said first voltage when an insertion operation to said main unit is performed without halting a power supply from said main unit;
- a bypass line for bypassing said first voltage control unit and said load voltage converter to supply an electric power from said main unit to said second element;
- a diode connected to said bypass line; and
- a second voltage control unit for controlling to increase gradually a voltage sneaking from said main unit to said load voltage converter via said bypass line when said insertion operation is performed.

19. The circuit mounting unit according to claim 18, wherein said first control unit comprises:
- a variable resistor that varies from a high resistance state thereof to a low resistance state thereof as a switching voltage externally added increases;
- a switching voltage converter that converts an electric power from said main unit into said switching voltage to supply to said variable resistor; and
- a capacitor inserted between an output terminal for said switching voltage of said switching voltage converter and a ground line, said variable resistor in said first voltage control unit being connected to a power supply line from said main unit to said load voltage converter.

20. The circuit mounting unit according to claim 19, wherein said variable resistor in said first voltage control unit comprises an N-channel field effect transistor.

21. The circuit mounting unit according to claim 19, further comprising a resistor which is connected in parallel to said capacitor in said first voltage control unit.

22. The circuit mounting unit according to claim 19, wherein said variable resistor and said switching voltage converter which constitute said first voltage control unit are previously formed in an integrated circuit form.

23. The circuit mounting unit according to claim 18, wherein said second voltage control unit comprises:
- a variable resistor that varies from a high resistance state thereof to a low resistance state thereof as a switching voltage externally added increases;
- a switching voltage converter that converts an electric power obtained from said main unit via said diode into said switching voltage to supply to said variable resistor; and
- a capacitor inserted between an output terminal for said switching voltage of said switching voltage converter and a ground line, said variable resistor in said second voltage control unit being connected to a power supply line from said load voltage converter to said second element.

24. The circuit mounting unit according to claim 23, wherein said variable resistor in said second voltage control unit comprises an N-channel field effect transistor.

25. The circuit mounting unit according to claim 23, further comprising a resistor which is connected in parallel to said capacitor in said second voltage control unit.

26. The circuit mounting unit according to claim 23, wherein said variable resistor and said switching voltage converter which constitute said second voltage control unit are previously formed in an integrated circuit form.

* * * * *